United States Patent [19]

Fritzsche

[11] Patent Number: 5,040,272
[45] Date of Patent: Aug. 20, 1991

[54] SPACING SENSOR ARRANGEMENT AND METHOD OF CHECKING THE SPACING BETWEEN A MAIN CARDING CYLINDER AND CARDING-MACHINE PARTS

[75] Inventor: Peter Fritzsche, Winterthur, Switzerland

[73] Assignee: Rieter Machine Works Limited, Winterthur, Switzerland

[21] Appl. No.: 480,140

[22] Filed: Feb. 14, 1990

[30] Foreign Application Priority Data

Feb. 16, 1989 [DE] Fed. Rep. of Germany ....... 3904732
Apr. 27, 1989 [DE] Fed. Rep. of Germany ....... 3913996

[51] Int. Cl.⁵ .......................... D01G 15/12; G01B 7/10
[52] U.S. Cl. ......................................... 19/104; 33/655; 324/229
[58] Field of Search .................... 19/98; 364/470, 474, 364/662; 324/229; 33/655, 657

[56] References Cited

U.S. PATENT DOCUMENTS

| | | | |
|---|---|---|---|
| 3,662,576 | 5/1972 | Girlatschek | 324/229 |
| 4,364,151 | 12/1982 | Beneke et al. | 19/98 |
| 4,384,388 | 5/1983 | Mondini . | |
| 4,395,827 | 8/1983 | Stone et al. | 33/655 |
| 4,451,892 | 5/1984 | McMurtry | 364/474.35 |
| 4,494,204 | 1/1985 | Hösel | 364/470 |
| 4,499,632 | 2/1985 | Varga | 19/98 |
| 4,804,905 | 2/1989 | Ding et al. | 324/662 |
| 4,820,980 | 4/1989 | Dodson-Edgars | 324/229 |
| 4,823,071 | 4/1989 | Ding et al. | 324/662 |
| 4,827,574 | 5/1989 | Nakano et al. | 19/98 |

FOREIGN PATENT DOCUMENTS

| | | | |
|---|---|---|---|
| 229595 | 12/1910 | Fed. Rep. of Germany . | |
| 3029052 | 2/1982 | Fed. Rep. of Germany . | |
| 3237864 | 4/1984 | Fed. Rep. of Germany | 364/470 |
| 429818 | 10/1911 | France . | |
| 48611 | 11/1986 | Japan | 19/98 |
| 94001 | 4/1922 | Switzerland . | |
| 438020 | 5/1972 | U.S.S.R. | 364/470 |
| 1068744 | 1/1984 | U.S.S.R. | 19/98 |
| 2204152 | 11/1988 | United Kingdom | 19/98 |

Primary Examiner—Werner H. Schroeder
Assistant Examiner—John J. Calvert
Attorney, Agent, or Firm—Sandler, Greenblum & Bernstein

[57] ABSTRACT

A carding machine comprises a main carding cylinder and parts which are adjustable relative thereto, such as a licker-in, a stationary flat, a revolving flat and a doffing cylinder, such parts preferably having a nominal spacing relative to the main carding cylinder. For checking a spacing, namely an existing spacing or an already adjusted spacing between the main carding cylinder and the aforesaid parts arranged opposite thereto, there is provided a sensor at at least one end or end portion of the main carding cylinder, but preferably at each one of the two ends or end portions thereof, such sensor or respective sensors being connected to an electronic evaluation unit by means of a coupling device.

22 Claims, 2 Drawing Sheets

SPACING SENSOR ARRANGEMENT AND METHOD OF CHECKING THE SPACING BETWEEN A MAIN CARDING CYLINDER AND CARDING-MACHINE PARTS

BACKGROUND OF THE INVENTION

The present invention broadly relates to improvements in cards or carding machines and pertains, more specifically, to a new and improved card or carding machine containing a spacing sensor arrangement. The present invention also relates to a new and improved method of checking the spacing between a main carding cylinder and carding-machine parts arranged opposite the latter.

Generally speaking, the card or carding machine of the present development is of the type comprising a main carding cylinder and parts adjustable relative thereto, such as a licker-in or licker-in cylinder, a stationary flat, a revolving flat and a doffing cylinder, such parts preferably having a nominal spacing relative to the main carding cylinder.

During assembly of a card or carding machine and during operation of such card or carding machine it is very important to accurately set and maintain the working or operational spacing between the spike clothing of the main carding cylinder and the corresponding clothings of the parts which cooperate or interact with the main carding cylinder.

These settings or adjustments have been hitherto manually effected by using gages. Such operation is relatively time-consuming and costly and can only be carried out by special skilled personnel. A further significant disadvantage lies in the fact that it was hitherto not possible to check the set or adjusted spacing during the actual operation of the card or carding machine. Therefore, it was extremely difficult to detect any changes in the settings or adjustments that were carried out, such changes resulting from centrifugal forces and thermal expansion.

In order to gain control of the problems in connection with thermal expansion, it is known, for example, from U.S. Pat. No. 4,499,632, granted Feb. 19, 1985 to maintain substantially constant and uniform the temperature of the main carding cylinder by means of a heat carrier. It is readily conceivable that such measures require a correspondingly high constructional expenditure and, moreover, are susceptible to leakage.

It is also known from German Patent No. 2,948,825, published Nov. 29, 1979 to maintain the working or operational conditions between two rotating cylinders of a staple fiber processing machine, which cylinders each are equipped with spiked clothing and process or mutually transfer a fiber web or fleece, by constantly adapting or surfaces to a predetermined value. For this purpose, there are provided positioning or adjusting devices which render possible a very accurate adjustment of the distance or spacing between the axes of rotation of the two rotating cylinders, the positioning or adjusting devices being controlled by means of control devices. The measurement signal of a parameter having a direct correlation to the diameter of one of the two rotating cylinders, such parameter being determined by a measuring unit, is supplied to the aforesaid control devices, whereby the latter then control the positioning or adjusting devices as a function of the aforementioned parameter. It is thus achieved that the disturbing influences of the centrifugal force and heating of the cylinders on the working or operational conditions are entirely precluded.

The aforesaid positioning or adjusting devices are either mechanical positioning means or thermally extensible structures, the length of which can be varied by the supply or removal of thermal energy.

The measurement signals which are supplied to the control means are, for example, the rotational speed of the main carding cylinder and/or the temperature thereof.

Furthermore, it is known that it could be possible to directly measure the spacing between the cylindrical surfaces or measure the diameter of the main carding cylinder by means of a corresponding suitable measuring unit, for example, a noncontact or contactless sensor or sensing device or a photo-optical measuring device.

SUMMARY OF THE INVENTION

Therefore, with the foregoing in mind, it is a primary object of the present invention to provide a new and improved card or carding machine containing a spacing sensor arrangement and which does not suffer from the aforementioned drawbacks and shortcomings of the prior art constructions.

Another and more specific object of the present invention aims at providing a new and improved card or carding machine which, with a minimum constructional expenditure, permits the spacing between the main carding cylinder and all carding-machine parts directly cooperating or interacting therewith to be reliably determined during assembly of the card or carding machine as well as during operation thereof or subsequent to servicing or maintenance work, and specifically without the operator requiring special training for this purpose.

Yet a further significant object of the present invention aims at providing a new and improved card or carding machine containing a spacing sensing arrangement which permits using the simplest possible means requiring a minimum of space and which is economical to manufacture and yet affords highly reliable operation thereof.

Now in order to implement these and still further objects of the present invention which will become more readily apparent as the description proceeds, the card or carding machine of the present development is manifested, among other things, by the features that a sensor is provided at at least one end or end portion of the main carding cylinder for rotation therewith. The sensor means is provided for the purpose of checking a spacing, such as an existing spacing or an already adjusted spacing between the main carding cylinder and the parts arranged opposite thereto, the sensor means being connected to an electronic evaluation unit by means of a coupling device.

The invention is thus based on the determination that by mounting a measuring sensor or sensing element at the main carding cylinder itself, it is possible to check in the most accurate manner the settings or adjustments of all the parts directly cooperating or interacting with the main carding cylinder, whereby this check can be effected even once per revolution of the main carding cylinder. Since the same sensor is used for all measurements with respect to the parts directly cooperating or interacting with the main carding cylinder, the spacing sensor arrangement constructed according to the invention does not result in any particular constructional expenditure. Furthermore, the spacing sensor arrangement of the present invention has the advantage that all measurements can also be carried out during operation of the card or carding machine, without parts of the card or carding machine having to be removed, so that for the first time it is rendered possible to very accurately detect the effects of centrifugal forces and thermal expansion during all stages of operation.

The sensor provided at at least one end or end portion of the main carding cylinder preferably constitutes a sensor arranged at each one of the two ends or end portions of the main carding cylinder.

A particularly preferred exemplary embodiment of the invention is characterized in that counter-elements are provided at the parts arranged opposite the main carding cylinder, such counter-elements being arranged opposite respective sensors at least in the measurement position and cooperating or interacting with the respective sensors.

By using such counter-elements which are in any case necessary for some types of sensors or sensing elements, it is possible to preclude measurement falsification by neighboring structures of the card or carding machine or of the respective parts of the card or carding machine. Furthermore, it is possible to arrange the counter-elements such that they lie on a level with the spikes or needles of the clothings of the associated carding-machine parts, so that, by arranging the sensors at the radial level of the spikes or needles of the clothing of the main carding cylinder, the spacing between counter-element and associated sensor is always the working or operational spacing between the tips of spikes or needles of the clothing of the main carding cylinder and the tips of the spikes or needles of the respective other part. In rotating carding-machine parts arranged opposite the main carding cylinder, such as, for example, a licker-in or a doffing cylinder, the counter-elements can be structured to be annular or ring-shaped, so that it is not only possible to establish the spacing between the working or operational spikes or needles, but also to determine any possible deformations or eccentricities of the main carding cylinder or of the licker-in. In this manner, it is possible to exploit the fact that the rotational speeds and the diameters are substantially different, so that with each revolution of the main carding cylinder the sensor cooperates with another region or portion of the associated annular or ring-shaped counter-element.

For each sensor there is preferably provided at least one slip or collector ring representing the coupling means for the read-out of the resulting signals, or for energizing the sensors with electrical energy or measurement pulses. The use of slip rings represents a simple measure for supplying the signals of the sensors rotating with the main carding cylinder to the electronic evaluation means or unit which is normally stationary and, in the opposite or reverse direction, for transmitting the energizing electric power from a stationary mains supply circuit to the respective sensors. However, the invention is not restricted to the use of slip rings for the coupling means.

The coupling means can also comprise a signal transmitting device which transmits signals to a receiving device by means of waves, for example, radio waves, light waves or sound waves, the signal transmitting device preferably rotating with the main carding cylinder.

The electronic evaluation means or unit is preferably synchronized with the rotation of the main carding cylinder such that there is effected an allocation of the signals of the sensors to the respective carding-machine parts arranged opposite the main carding cylinder.

It is possible, for example, to provide a device for generating a trigger signal, in order to facilitate the allocation of the desired signals to the carding-machine parts to be measured. The device for generating trigger signals could comprise, for example, two counter-elements which are arranged in tandem with a minimum of clearance between each other.

The sensors can be any conventional type of distance measuring sensors, for example, inductive, capacitive or optical sensors, for instance optical sensors which are constructed as V-light barriers. As a rule, the sensors constructed according to the invention will operate in noncontacting manner, so that no wear and thus also no falsification of the measured value can occur. During assembly of the card or carding machine, the values determined by the sensors can be compared with actually measured values and can be used to calibrate the electronic evaluation means or unit.

As alluded to above, the invention is not only concerned with the aforementioned new and improved card or carding machine containing a spacing sensor arrangement, but also relates to a new and improved method of checking the spacing between the main carding cylinder and carding-machine parts arranged opposite the latter.

The new and inventive method of checking the spacing between the main carding cylinder and carding-machine parts arranged opposite the latter is manifested, among other things, by the step of measuring the spacing at all times from the main carding cylinder to the associated carding-machine part.

This step of measuring the spacing at all times from the main carding cylinder entails carrying out the measurement of the spacing at at least one end or end portion of the main carding cylinder, but preferably at both ends or end portions of the main carding cylinder.

BRIEF DESCRIPTION OF THE DRAWINGS

The invention will be better understood and objects other than those set forth above will become apparent when consideration is given to the following detailed description thereof, such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the exemplary embodiments of the card or carding machine and related structure have been illustrated therein as is needed to enable one skilled in the art to readily understand the underlying principles and concepts of this invention.

Figure 1:
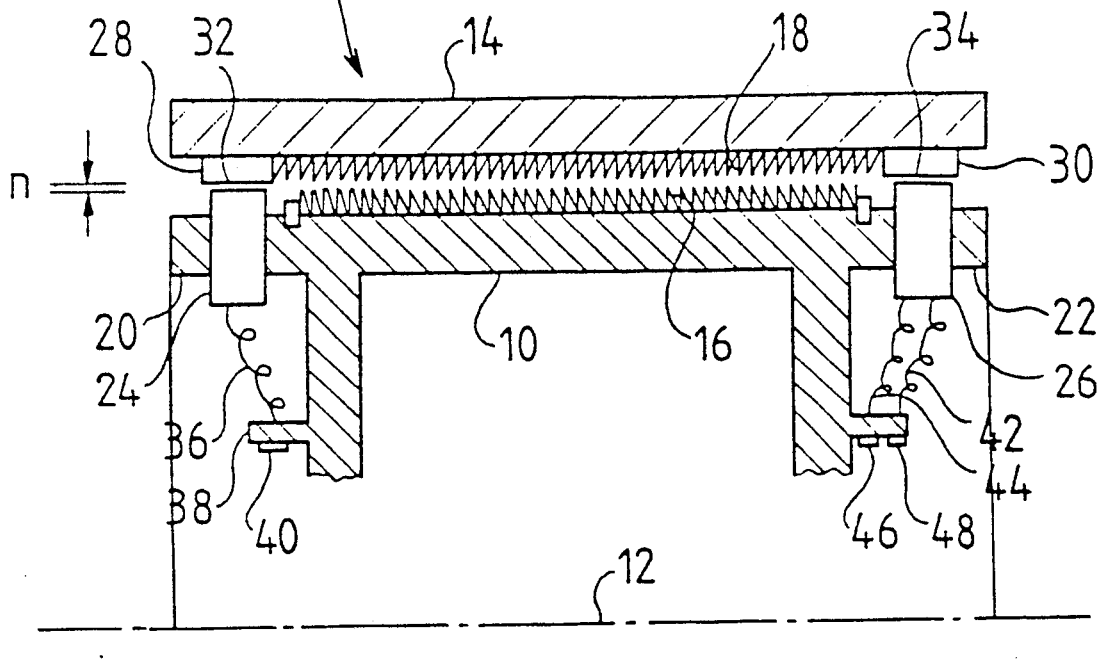
FIG. 1 schematically shows a partial longitudinal section through a main carding cylinder of a card or carding machine and which section is taken in the region of a stationary flat which cooperates with the main carding cylinder.

Turning attention now specifically to FIG. 1 of the drawings, a card or carding machine 90 illustrated therein by way of example and not limitation will be seen to comprise a main carding cylinder 10 which, in operation, rotates about an axis of rotation 12. The partial longitudinal section through the main carding cylinder 10 is taken substantially through a plane containing the axis of rotation 12, and in which plane there is provided a stationary flat 14 which is arranged opposite or confronting the main carding cylinder 10. The main carding cylinder 10 is provided with spiked clothing 16 at the jacket or outer surface thereof. The operational tips of the spiked clothing 16 should possess a nominal or rated spacing n with respect to the operational tips of a corresponding spiked clothing 18 of the stationary flat 14. For measuring such spacings the drum-shaped main carding cylinder 10 comprises at end flanges 20 and 22 located at the opposed ends or end regions thereof respective sensors 24 and 26. Counter-elements 28 and 30 are provided at the stationary flat 14 and arranged opposite the respective sensors 24 and 26. These counter-elements 28 and 30 comprise respective working surfaces 32 and 34 which face or confront the sensors 24 and 26, respectively. These working surfaces 32 and 34 possess the same radial height as the working or operational tips of the spiked clothing 18. Such working surfaces 32 and 34 can be structured to be plane or flat, in which case the spacing n changes fractionally during the rotational movement of the main carding cylinder 10 past the stationary flat 14. On the other hand, these working surfaces 32 and 34 of the stationary flat 14 can possess a curvature with a center of curvature located at the axis of rotation 12, whereby the spacing n remains at least substantially constant during the rotational movement of the main carding cylinder 10 past the stationary flat 14.

The sensors 24 and 26 can be any known kind of noncontact or contactless or proximity-type distance measuring sensor. Simply for reasons of illustration two different measuring sensors or sensing elements are depicted in FIG. 1, although the two sensors 24 and 26 will normally be of the same construction. The sensor 24 located at the cylinder end flange 20 requires only a single signal line or conductor 36 which leads to a slip ring 40 mounted at an annular flange 38 of the main carding cylinder 10. Here the signal can be tapped off by means of a normal brush contact which is not particularly shown in the drawing of FIG. 1. In the case of the sensor 26 located at the cylinder end flange 22 there are provided two lines or conductors 42 and 44 which lead to two respective slip ring contacts 46 and 48.

Figure 2:
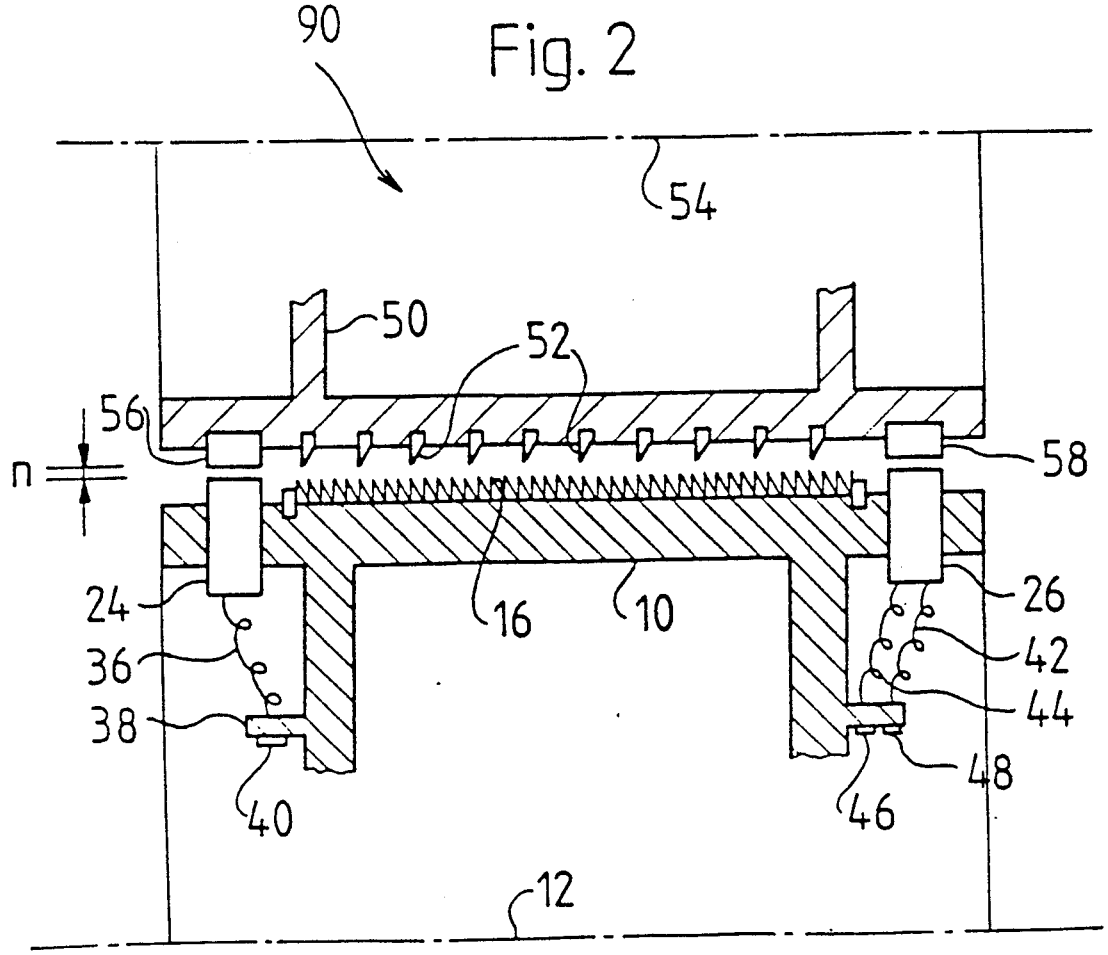
FIG. 2 schematically shows a partial longitudinal section of the main carding cylinder of the card or carding machine depicted in FIG. 1, but the section is taken in the region of the narrowest gap between a licker-in and the main carding cylinder, i.e. in a plane containing the axes of rotation of the licker-in and the main carding cylinder.

The exemplary embodiment of the card or carding machine 90 depicted in FIG. 2 is similar to that of the exemplary embodiment shown in FIG. 1, so that there have been generally used the same reference characters to denote the same or analogous components. As depicted in FIG. 2, a licker-in or licker-in cylinder 50 is equipped with saw-toothed clothing 52. In this embodiment, the spacing n is measured between the working or operational tips of the saw-toothed clothing 52 of the licker-in 50 and the working or operational tips of the spiked clothing 16 of the main carding cylinder 10; for which purpose the same sensors 24 and 26 are used in the same manner as in the case of the measurement of the spacing of the stationary flat 14 depicted in FIG. 1. The sectional plane of FIG. 2 contains both the axis of rotation 12 of the main carding cylinder 10 and the axis of rotation 54 of the licker-in 50, so that the spacing n in this sectional plane is the smallest possible spacing. In this exemplary embodiment depicted in FIG. 2, counter-elements 56 and 58 are structured to be annular or ring-shaped and are co-axially arranged with respect to the axis of rotation 54 of the licker-in 50, whereby the spacing n can be measured at different angles of rotation of the licker-in 50, in order to obtain information concerning the deformation or eccentricity of the latter. When the licker-in 50 is not in rotation, information can likewise be obtained with respect to possible deformation or eccentricity of the main carding cylinder 10, whereby such information can also be determined by means of any other carding-machine part which cooperates or interacts with the main carding cylinder 10.

Figure 3:
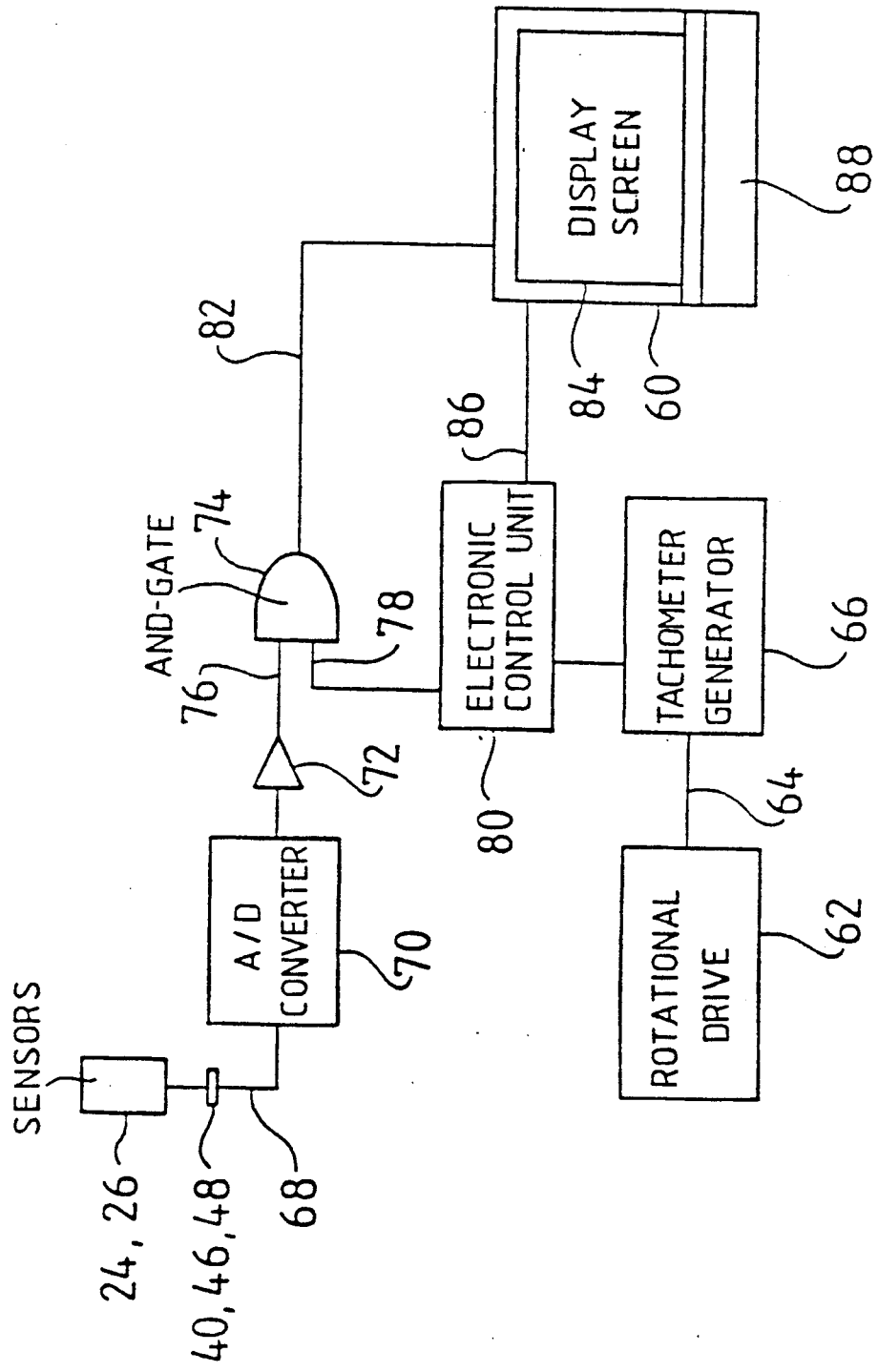
FIG. 3 shows a schematic block circuit diagram of an electronic evaluation means or unit.

FIG. 3 schematically depicts the evaluation and processing of measurement signals arriving from the measuring sensors 24 and 26, respectively. The electronic evaluation means or unit is constructed in the form of a microcomputer 60 or the like. A rotational drive 62 for the main carding cylinder 10 is coupled by means of a drive shaft 64 to a tachometer generator 66 which serves as a clock or timing source for synchronization of the microcomputer or microprocessor 60 with the measurement signals. The measurement signals arriving from the measuring sensors 24 and 26 lead via the respective slip ring contacts 40, 46 and 48 and a brush contact 68 to an analog-to-digital converter 70, insofar as the measurement signals from the sensors 24 and 26 are not already in digital form. An amplifier 72 and an AND-gate 74 are connected downstream of the analog-to-digital converter 70. In other words, the amplified digital measurement signal is applied to one input 76 of the AND-gate 74. A signal then arrives at another input 78 of the AND-gate 74 from an electronic control circuit 80 when, for example, the measuring sensor 26 is directly opposite the licker-in 50. The measurement signal which is now present is then supplied via a line 82 to the microcomputer or microprocessor 60 which determines from such measurement signal the spacing between the main carding cylinder 10 and the licker-in 50, and portrays the actual value on a display or image screen 84.

The electronic control circuit 80 is controlled by the microcomputer or microprocessor 60 via a line 86 such that the electronic control circuit 80 only applies a signal to the input 78 when, on the basis of the signals of the tachometer generator 66, the measuring sensors are located in an angular position in which a measurement is possible with respect to the licker-in 50.

Operating personnel can also request other spacing values via a keyboard 88, for example, the spacing from the main carding cylinder 10 to the stationary flat 14 or to a doffing cylinder not particularly shown in the drawings. For this purpose, a corresponding control signal is transmitted via the line 86 to the electronic control circuit 80, whereby it is only the desired measurement signal which appears at the microcomputer or microprocessor 60 from the AND-gate 74 via the line 82 and it is this measurement signal which is then evaluated and indicated.

It will be appreciated that many of the described functions can also be carried out directly by the microcomputer or microprocessor 60. If the microcomputer 60 is, for example, the computer which is also used for the operation of the entire card or carding machine 90, such computer also generating the control signals for the control or regulation of the drives of the card or carding machine 90, then the signal from the respective measurement sensors can be supplied directly to the computer and the entire measurement evaluation can be carried out by corresponding algorithms in the computer.

Having measured the spacing n between the main carding cylinder 10 and one or more carding-machine parts arranged opposite thereto, the possibility then exists of adjusting the card or carding machine 10 while in operation, in order to bring or adjust the measured value to the desired value of the nominal spacing n. This adjustment of the card or carding machine 90 can take place in accordance with any of the known methods. By way of example, the carding-machine parts cooperating or interacting with the main carding cylinder can be mounted in accordance with, for example, the aforementioned German Patent No. 2,948,825, published Nov. 29, 1979 on one or more thermally extensible or contractible parts and the relative positions of the main carding cylinder 10 and the oppositely disposed carding-machine part or parts can be controlled by controlling the temperature of such thermally extensible and contractible parts. Alternatively, the spacing n can be controlled by mounting one or more of the carding-machine parts arranged opposite the main carding cylinder 10, for example, the licker-in 50 or a doffing cylinder, on an adjustable mounting, preferably a mounting in which the slip-stick phenomenon is substantially avoided. Such a mounting, which would be suitable for the present purpose is disclosed, for example, in German Patent Application No. P 39 07 517.6 (German Patent Attorney's reference R 2696) entitled "Regulation of the Carding Gap", or in the later German Patent Application P 39 40 229.0 (German Patent Attorney's reference R 2893) entitled "Adjustment Device".

While there are shown and described present preferred embodiments of the invention, it is to be distinctly understood that the invention is not limited thereto, but may be otherwise variously embodied and practiced within the scope of the following claims. Accordingly,

What I claim is:

1. A carding machine comprising
a main carding cylinder having two end portions;
a predetermined number of carding-machine parts which are adjustable relative to said main carding cylinder;
a predetermined number of carding-machine parts which are adjustable relative to said main carding cylinder;
said predetermined number of carding-machine parts each defining a respective nominal spacing relative to said main cylinder;
sensor means provided at at least one end portion of said two end portions of said main carding cylinder for rotation therewith for sensing the spacing of said carding cylinder from at least one of said carding-machine parts;
electronic evaluation means;
coupling means for coupling said sensor to said electronic evaluation means;
said coupling means constituting at least one slip ring for said sensor; and
said at least one slip ring serving for reading out signals which arise and for selectively providing said sensor with at least any one of electrical energy or measuring pulses.

2. The carding machine as defined in claim 1, wherein:
said sensor means comprises a sensor arranged at each one of said two end portions of said main carding cylinder for rotation therewith.

3. The carding machine as defined in claim 1, further including:
a counter-element provided at each one of said predetermined number of carding-machine parts and arranged opposite said sensor;
said sensor means having a predetermined measuring position; and
each said counter-element cooperating with said sensor means at least at said predetermined measuring position thereof.

4. The carding machine as defined in claim 3, wherein:
said main carding cylinder possesses a predetermined rotational speed; and
means for synchronizing said electronic evaluation means to said predetermined rotational speed of said main carding cylinder such that an allocation of signals of said sensor means to respective carding-machine parts of said predetermined number of carding-machine parts is effected.

5. The carding machine as defined in claim 4, further including:
means for generating a trigger signal to facilitate said allocation of said signals of said sensor means.

6. The carding machine as defined in claim 1, wherein:
said sensor constitutes an inductive sensor.

7. The carding machine as defined in claim 1, wherein:
said sensor constitutes a capacitive sensor.

8. The carding machine as defined in claim 1, wherein said sensor constitutes an optical sensor which is constructed as a V-light barrier.

9. The carding machine as defined by claim 1, further comprising means for readjusting said spacing operatively associated with said sensing means for maintaining said spacing of a predetermined nominal value.

10. A carding machine comprising:
a main carding cylinder having two end portions;
a predetermined number of carding-machine parts which are adjustable relative to said main carding cylinder;
said predetermined number of carding-machine parts each defining a respective nominal spacing relative to said main cylinder;
sensor means provided at at least one end portion of said two end portions of said main carding cylinder for rotation therewith for sensing the spacing of said carding cylinder from at least one of said carding-machine parts;
electronic evaluation means;
coupling means for coupling said sensor to said electronic evaluation means;
signal receiving means;
said coupling means constituting a signal transmitting device;
said signal transmitting device rotating with said main carding cylinder; and said signal transmitting device serving for transmitting signals by means of waves to said signal receiving means.

11. The carding machine as defined in claim 10, wherein:
said waves constitute radio waves.

12. The carding machine as defined in claim 10, wherein:
said waves constitute light waves.

13. The carding machine as defined in claim 10, wherein:
said waves constitute sound waves.

14. A carding machine comprising:
a main carding cylinder having two end portions;
said main carding cylinder adapted to rotate at a predetermined rotational speed;
a predetermined number of carding-machine parts which are adjustable relative to said main carding cylinder;
said predetermined number of carding-machine parts each defining a respective nominal spacing relative to said main cylinder;
sensor means provided at at least one end portion of said two end portions of said main carding cylinder for rotation therewith for sensing the spacing of said carding cylinder from at least one of said carding-machine parts;
electronic evaluation means;
coupling means for coupling said sensor to said electronic evaluation means;
a counter-element provided at each one of said predetermined number of carding-machine parts and arranged opposite said sensor;
said sensor means having a predetermined measuring position;
each said counter-element cooperating with said sensor means at least at said predetermined measuring position thereof;
means for synchronizing said electronic evaluation means to said predetermined rotational speed of said main carding cylinder such that an allocation of signals of said sensor means to respective carding-machine parts of said predetermined number of carding-machine parts is effected; and
means for generating a trigger signal to facilitate said allocation of said signals of said sensor means;
said means for generating a trigger signal being structured such that said counter-element provided at each one of said predetermined number of carding-machine parts constitutes two counter-elements arranged at tandem.

15. A method of checking the spacing between a main carding cylinder having opposite end portions and at least one carding-machine part arranged opposite the main carding cylinder, the main carding cylinder having sensor means mounted thereon for rotation therewith and a signal transmitting device thereon for rotation therewith for coupling the sensor means to an electronic evaluation means, the method comprising the step of:
measuring the spacing between the main carding cylinder and said carding-machine part with said sensor means on said main carding cylinder by transmitting signals by means of said signal transmitting device by means of wave to a signal receiving means.

16. The method as defined in claim 15, wherein:
said step of measuring the spacing at all times from the main carding cylinder entails carrying out the measurement of the spacing from at least one end portion of the main carding cylinder.

17. The method as defined in claim 15, wherein:
said step of measuring the spacing at all times from the main carding cylinder entails carrying out the measurement of the spacing from both opposite end portions of the main carding cylinder.

18. The method as defined in claim 15, further including the steps of:
using the measured spacing between the main carding cylinder and the at least one carding-machine part as an input value for said electronic evaluation means;
evaluating the measured value in said electronic evaluation means; and
controlling the position of the carding-machine parts relative to the main carding cylinder and correcting the spacing therebetween to assume a predetermined nominal value.

19. The method as defined in claim 15, wherein:
said waves being transmitted are radio waves.

20. The method as defined in claim 15, wherein:
said waves being transmitted are light waves.

21. The method as defined in claim 15, wherein:
said waves being transmitted are sound waves.

22. A method of checking the spacing between a main carding cylinder having opposite end portions and at least one carding-machine part arranged opposite the main carding cylinder, the main carding cylinder having sensor means mounted thereon for rotation therewith and a signal transmitting device thereon for rotation therewith for coupling the sensor means to an electronic evaluation means, the signal transmitting device comprising at least one slip ring for said sensor means, the method comprising the step of:
measuring the spacing between the main carding cylinder and said card-machine part with said sensor means on said main carding cylinder by transmitting signals by reading out signals which arise and for selectively providing said sensors with at least any one of electrical energy or measuring pulses.

* * * * *